UNITED STATES PATENT OFFICE.

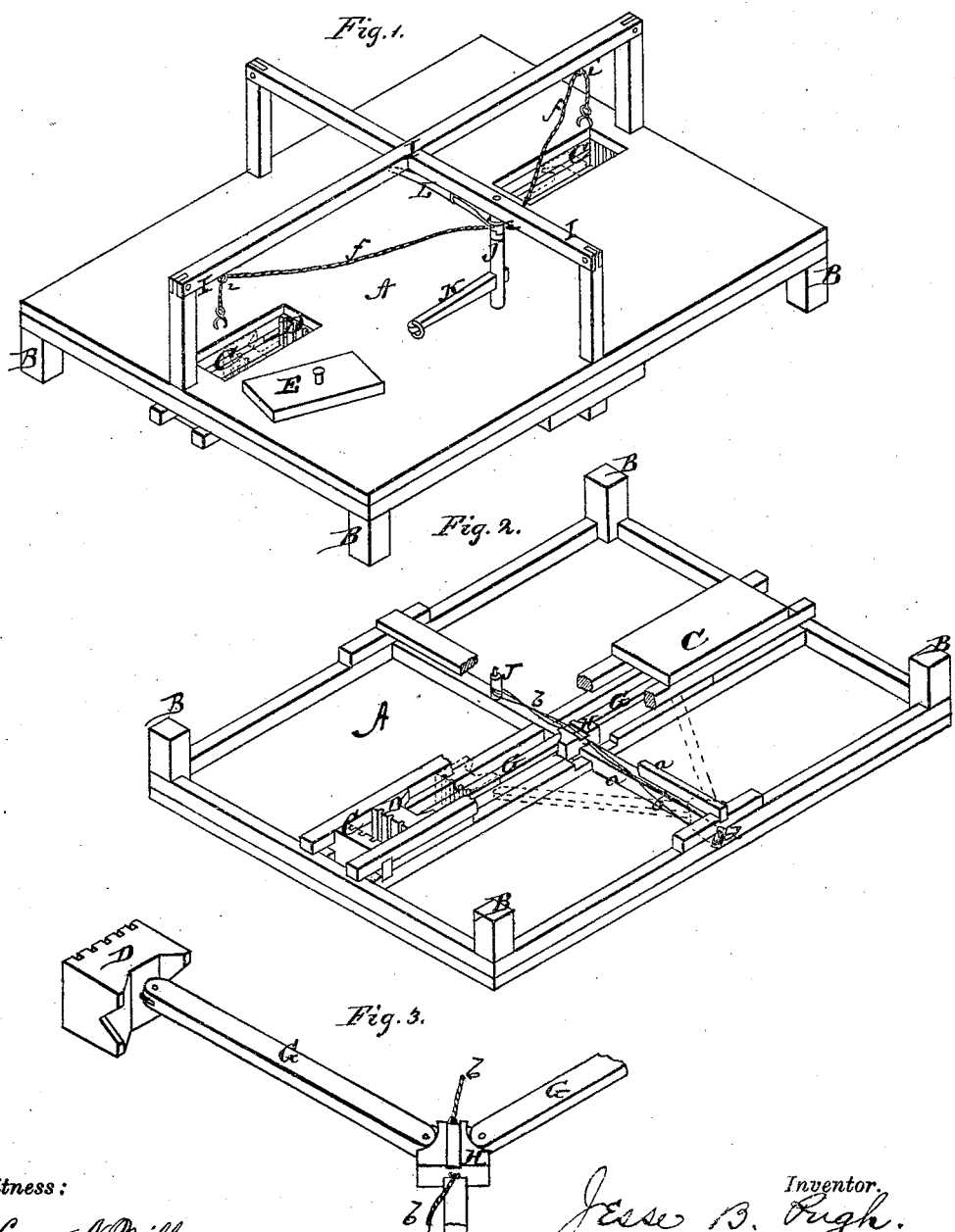

JESSE B. PUGH, OF CHAMPAIGN, ILLINOIS.

IMPROVEMENT IN HAY AND COTTON PRESSES.

Specification forming part of Letters Patent No. 134,097, dated December 17, 1872.

*To all whom it may concern:*

Be it known that I, JESSE B. PUGH, of Champaign, in the county of Champaign and in the State of Illinois, have invented certain new and useful Improvements in Hay-Press; and do hereby declare that the following is a full, clear, and exact description thereof, reference being had to the accompanying drawing and to the letters of reference marked thereon making a part of this specification.

The nature of my invention consists in the construction and arrangement of a hay-press for pressing two bales at the same time, as will be hereinafter more fully set forth.

In order to enable others skilled in the art to which my invention appertains to make and use the same, I will now proceed to describe its construction and operation, referring to the annexed drawing, in which—

Figure 1 is a perspective view from the top; Fig. 2, a perspective view from the bottom of my hay-press; and Fig. 3 is an enlarged perspective view of a part of the operating mechanism.

A represents a platform, of any suitable dimensions, supported upon posts B B. In the platform A are made two openings leading into the bale-boxes C C, which are arranged longitudinally directly opposite each other and on the same line. Each box is provided with a follower, D, which moves under the platform from the center outward to press the bale, the openings in the platform to the boxes being closed by covers E as soon as enough hay has been placed in the boxes. To the back of each follower D is pivoted or hinged a lever, G, and the other ends of said levers are hinged or pivoted to a head-block, H, which moves in guides $a\ a$, horizontally under the platform, and at right angles with the line of movement of the followers. The connections between the levers G G and the followers and head-block should be so made that in pressing the ends of the levers should bear on said parts directly, and have no strain on the pivots. The head-block H is moved back and forth in the guides $a\ a$ by the following means: On the upper side of the platform A is erected a cross-frame, I, one part of which extends above and beyond the openings to the bale-boxes, and the other part running at right angles with the former above the guides $a\ a$. In this part of the frame I, and on the opposite side from the center from where the head-block H moves, is placed an upright windlass, J, provided with a sweep, K, to which the horse is to be attached. This windlass extends below the platform A, and a rope, $b$, is wound around the same. One end of the rope $b$ passes directly to the head-block H, while the other end goes around a pulley, $d$, at the other side of the platform, and then back to the head-block.

It will readily be seen that when the horse moves in one direction the rope $b$ will draw the head-block inward toward the center and force the followers D D outward so as to press the bales in their respective boxes; and that when the horse moves in the opposite direction the other end of the rope $b$ will draw the head-block outward, thereby withdrawing the followers in the bale-boxes—one end of the rope unwinding from while the other winds upon the windlass.

At the upper end of the windlass J is a movable collar, $e$, with clutch, which is thrown in and out of gear with the windlass by means of a lever, L, as shown in Fig. 1. To this collar is attached a rope, $f$, the ends of which pass through guides or staples $i\ i$ in the frame I, one over each bale-box, so that when the bales are pressed the rope may be attached, by hooks or otherwise, to them, and the collar $e$ thrown in gear with the windlass. Then, when the horse is started to withdraw the followers D D, the rope $f$ will be wound upon the collar $e$ and lift or raise the bales out of the boxes.

It will be seen that the entire pressing mechanism is arranged under the platform and out of the way of the horse in traversing around the windlass, and the working parts are all protected from the dust and dirt that will oftentimes clog and retard the free operation of the parts.

Having thus fully described my invention, what I claim as new, and desire to secure by Letters Patent, is—

1. The arrangement, under a platform, A, of two bale-boxes, C C, with followers D D, operated from a single head-block, and with the power for operating the same on top of the platform, substantially as herein set forth.

2. The combination of the followers D D, levers G G, head-block H, and rope *b* arranged under the platform A, and the windlass J, all substantially as and for the purposes herein set forth.

In testimony that I claim the foregoing I have hereunto set my hand this 9th day of September, 1872.

J. B. PUGH.

Witnesses:
 C. L. EVERT,
 A. E. HARMON.